Sept. 16, 1924.

W. N. SAWYER

SPINDLE HOLDING MEANS

Filed Jan. 15, 1924

INVENTOR:
Willard N. Sawyer
BY Robt H Harris
ATTORNEY

Patented Sept. 16, 1924.

1,509,056

UNITED STATES PATENT OFFICE.

WILLARD N. SAWYER, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

SPINDLE-HOLDING MEANS.

Application filed January 15, 1924. Serial No. 686,338.

*To all whom it may concern:*

Be it known that I, WILLARD N. SAWYER, a citizen of the United States, residing at Winchendon, in the county of Worcester and State of Massachusetts, have invented an Improvement in Spindle-Holding Means, of which the following description, in connection with the accompanying drawings, is a specification, like characters on the drawings representing like parts.

This invention relates to machines employing a tool driving spindle, and more particularly to means for holding the spindle from rotating while a tool is being applied to or removed from the spindle.

In various wood and metal working machines driving spindles are employed and are provided with means for removably securing a cutting tool to the spindle. A threaded construction is commonly employed for removably securing the tool to its spindle, and in tightening up or loosening the threaded means, it is usually necessary to hold the spindle from rotation while force is applied to the thread means to rotate the same to or from the tool clamping positions.

Heretofore it has been customary to provide tool operating spindles of the type above mentioned with a slot or hole extending transversely thru the spindle and adapted to receive a bar which is inserted to prevent rotation of the spindle while a tool is being secured to or removed from the spindle. This means of preventing rotation of the spindle is open to the objection that the machine attendant often forgets to remove the bar before applying the driving power to the spindle, and if the spindle is belt-driven, the failure to remove the holding bar may do nothing worse than bend or break the bar, but if the spindle is electrically driven the driving motor may be burnt out by applying the current when the spindle is locked against rotation.

Having the above matters in mind, an important feature of the present invention resides in means that may be easily moved into holding engagement with a tool operating spindle, and which will move automatically out of engagement with the spindle as soon as released so that all danger of applying power to the spindle before the holding means is removed is avoided.

Another feature of the invention resides in a treadle associated with the spindle holding means whereby the machine attendant may use his foot to move the holding means into its spindle locking position.

Other features of the invention in addition to the above will be hereinafter described in connection with the accompanying drawings which illustrate one good practical form thereof.

In the drawings:—

Figure 1:
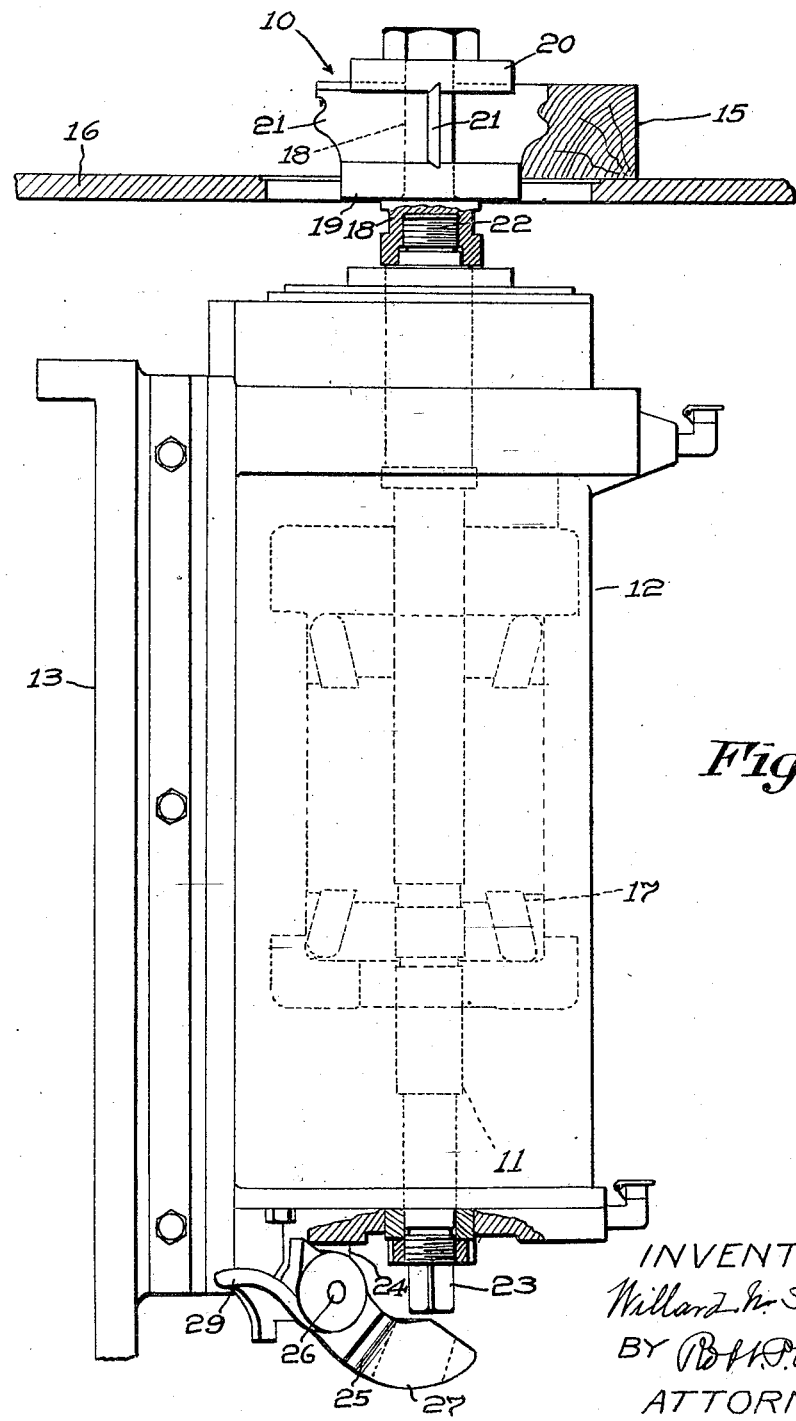
Fig. 1 is a side elevation of a wood-cutting machine having the present invention associated therewith.
Figure 2:
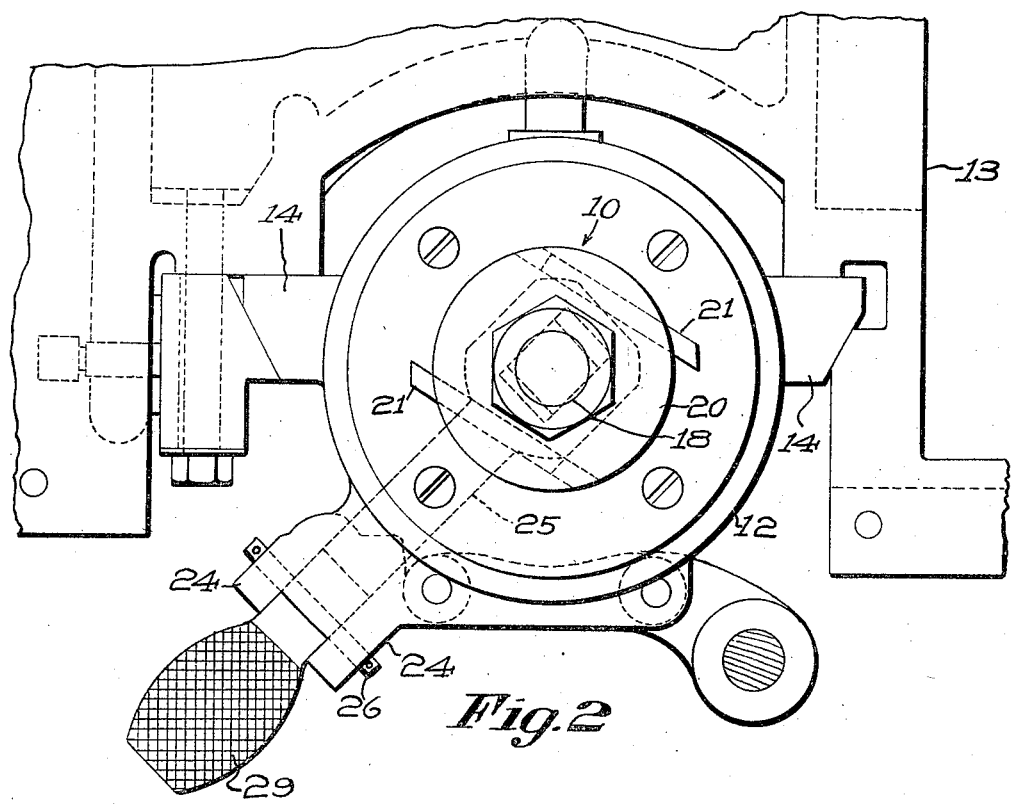
Fig. 2 is an enlarged top plan view of Fig. 1, the work supporting table being omitted.
Figure 3:
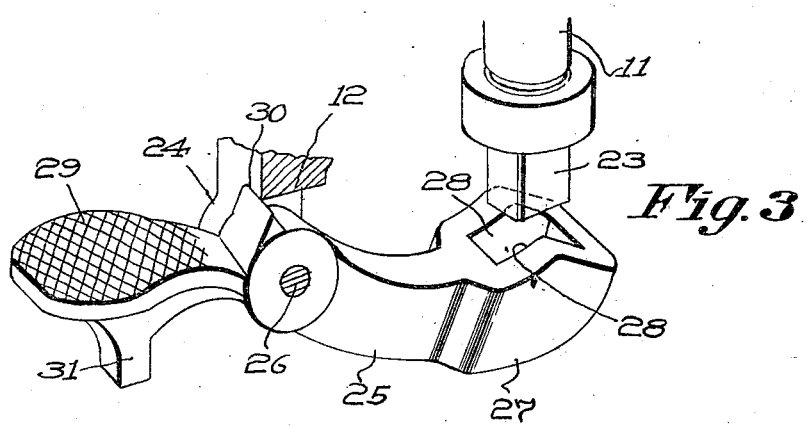
Fig. 3 is a perspective view of the lower portion of the machine spindle and associate holding means.

The spindle holding means of the present invention may be used upon various different types of machines employing a tool operating spindle, and may be used in connection with spindles driven by belt, electric motor or other means, but is illustrated in the drawings as associated with the driving spindle of a wood shaper.

In the drawings is shown the cutter operating portion and work supporting table of a wood shaper; and the cutter head 10 is operatively secured to the vertical spindle 11 which is rotatably mounted in suitable bearings within the casing 12. The casing 12 is shown as slidably secured to an upright portion 13 of the supporting frame and has oppositely extending flanges 14 that engage the dove-tail slide-way of the upright 13. The construction is such that the casing 12 may be moved up or down to vary the position of the cutter head 10 relative to the work 15 resting upon the work supporting table 16. The spindle 11 is shown as driven by an electric motor 17 enclosed within the casing 12 but the earlier types of wood shaper are commonly driven by a belt.

The cutter 10 illustrated consists of a short shaft 18 provided with the spaced washers 19 and 20 between which the cutter blades 21 are clamped, and the lower end of the shaft 18 has a threaded socket adapted to receive the threaded end 22 of the spindle 11. The arrangement is such that the cutter head 10 may be readily secured to the spindle 11 by screwing the head 10 on to the threaded spindle end 22. The construction so far described forms no part of the present invention, but will serve to make clear one form of tool-driving spindle with which the present invention may be associated.

As above stated cutting tools are commonly secured to their operating spindle by a threaded connection, and it is necessary to hold the spindle from rotation while the threaded means is being tightened up or backed off. The present invention is directed to a novel construction for holding the spindle from rotating, which will now be described.

In the construction shown the lower end of the spindle 11 has its opposite sides cut away to form flat faces 23 adapted to be engaged and held by spaced jaws to be described. The casing 12 in the construction shown has spaced lugs 24 at its lower end between which a lever 25 is pivotally secured by a pin 26, and the inwardly extending end of this lever is constructed to form a wrench or socket 27 having the spaced jaws 28 to receive the flat faces 23 of the spindle therebetween.

The lever 25 is constructed so that its spindle-engaging end will normally lie out of engagement with the spindle 11, as shown, but may be moved into engagement with the spindle by rocking the lever upwardly about its pivot pin 26. It is desirable that the construction be such that the spindle holding means will move automatically out of engagement with the spindle as soon as the holding means is released, and in the construction shown the portion 27 of the lever is made relatively heavy so that it will move downwardly by gravity as soon as released.

In the construction shown the spindle-holding means is located at the lower end of the casing 12 and is preferably provided with a treadle 29 adapted to be engaged by the foot of the machine attendant, the arrangement being such that when a cutter head 10 is to be applied to or removed from the spindle 11 the machine attendant presses on the treadle 29 to hold the inner end of the lever 25 in locking engagement with the spindle while a turning force is being exerted upon the head 10, and as soon as the attendant removes his foot from the treadle 29 the lever rockets automatically to its inactive position to release the spindle. Rocking movement of the inner end of the lever 25 downwardly may be limited by a lug 30 and if desired rocking movement of this lever in the opposite direction may be limited by a projection 31 that may contact with the floor upon which the machine rests.

What is claimed is:—

1. In combination with a machine having a vertical spindle for operating a tool, means for holding the spindle from rotating while a tool is being secured to or removed from the spindle, comprising a lever pivotally mounted near the lower end of the spindle and constructed to form a wrench adapted to be swung into holding engagement with the lower end of the spindle as the lever is rocked.

2. In combination with a machine having an upright spindle for operating a tool, means for holding the spindle from rotating, comprising a lever pivotally mounted and constructed to form a wrench positioned to be swung into holding engagement with the spindle as the lever is rocked in one direction by the machine attendant and constructed to swing automatically out of engagement with the spindle when released by the machine attendant.

3. In combination with a machine having an upright spindle for operating a tool, means for holding the spindle from rotating while a tool is being secured to or removed from the spindle, comprising a lever constructed to form a wrench and mounted so that upward rocking movement of the lever moves the wrench into holding engagement with the spindle, and the wrench end of the lever being sufficiently heavy to cause the wrench to move out of engagement with the spindle upon the lever being released.

4. In combination with a machine having an upright spindle for operating a tool, means for holding the spindle from rotating while a tool is being secured to or removed from the spindle, comprising a lever constructed to form a wrench and mounted so that the lever may be rocked to move the wrench into holding engagement with the spindle, a foot treadle connected to the lever so that pressure upon the foot treadle moves the wrench into holding engagement with the spindle, and the lever being constructed and arranged to move the wrench automatically out of engagement with the spindle when pressure upon the foot treadle is removed.

5. In combination with a maching having an upright spindle for operating a tool, means for holding the spindle from rotating while a tool is being secured to or removed from the spindle, comprising flattened faces formed upon the opposite sides of the spindle and a lever mounted upon the machine frame for movement into and out of engagement with the spindle and provided with spaced jaws adapted to engage the flattened faces and hold the spindle from rotating, and means for automatically moving the lever out of engagement with the spindle.

6. In combination with a machine having an upright spindle for operating a tool, means for holding the spindle from rotating, comprising flattened faces formed upon the opposite sides of the spindle at its lower end, a lever pivotally supported near the lower end of the spindle and provided with spaced jaws adapted to engage said flattened faces and hold the spindle from rotation when the lever is rocked into spindle engaging position, a foot treadle for rocking the lever to spindle engaging position, and the spindle engaging end of the lever being sufficiently heavy to cause it to move automatically out of engagement with the spindle when pressure is relieved from the foot treadle.

7. In combination with a machine having a spindle for operating a tool, means for holding the spindle from rotating while a tool is being secured to or removed from the spindle, comprising a lever having spaced jaws at its inner end and pivotally mounted so that the lever may be rocked in one direction to move the jaws into engagement with the spindle to hold the spindle against rotation and the lever being adapted to move automatically out of engagement with the spindle when released.

8. In combination with a machine having a spindle for operating a tool, means for holding the spindle from rotation while a tool is being secured to or removed from the spindle, comprising a non-circular portion provided upon the spindle, and a lever having a spindle engaging portion constructed to conform to said non-circular portion and the lever being pivotally mounted so that it may be rocked in one direction to move its end into holding engagement with the spindle and adapted to move automatically out of holding engagement with the spindle when released.

In testimony whereof, I have signed my name to this specification.

WILLARD N. SAWYER.